Patented Dec. 30, 1930

1,786,950

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

CATALYTIC OXIDATION OF ANTHRACENE

No Drawing. Original application filed August 8, 1927, Serial No. 211,638. Divided and this application filed March 29, 1928. Serial No. 265,819.

This invention relates to the catalytic oxidation of anthracene to anthraquinone in the vapor phase.

According to the present invention anthracene is oxidized to anthraquinone in the vapor phase by means of air or other oxidizing gas, in the presence of a new class of catalysts or contact masses, namely, catalysts or contact masses which contain non-silicious base exchange bodies, diluted or undiluted. Some of these new catalysts and contact masses have been described and claimed as products in my Patent No. 1,694,620, dated December 11, 1928, of which the present application is in part a continuation. The catalytic oxidation of organic compounds generally by means of catalysts or contact masses containing non-silicious base exchange bodies has been described and claimed broadly in my application Serial No. 211,638, filed August 8, 1927, which matured into Patent No. 1,735,763, dated November 12, 1929, of which the present application is a division.

The non-silicious base exchange bodies used in the present invention may be produced by the reaction of metallate components with metal salt components under conditions so that the reaction mixture remains substantially alkaline to litmus. The invention is in no sense restricted to the use of catalysts which are the reaction products of a single metallate and a single metal salt component, and some of the most effective catalysts for use in the present invention are the reaction products of a plurality of metallate components with one or more metal salt components or a plurality of metal salt components with one or more metallate components.

All of the base exchange bodies used in the present invention, that is to say catalytically active bodies which are prepared by the reaction of a single metallate with a single metal salt or bodies produced by the reaction of at least one metallate with a plurality of metal salts, or vice versa, possess a remarkably porous, frequently microporous, structure and in some cases are opalescent. When suitable catalytically active components are present in the products, they form catalysts of remarkable efficiency due probably to the extraordinarily high surface energy of the microscopically porous structures and probably also to the presence of unsaturated valences in many cases and a symmetry of molecules. It is of course possible that the catalytic activity of the products is due partly or wholly also to other reasons, and the present invention is not intended in any sense to be limited by any theory of action of the products. The molecular complexes which are present are apparently of great size and complexity, and the exact chemical constitution has not been determined. In fact it is not even definitely determined whether single chemical compounds are formed in any or all cases and it is possible that molecular mixtures are present. The products possess a physically microscopical homogeneity and behave in many ways as if they were single compounds, and I am of the opinion that probably in many cases the products are in fact single compounds of very high molecular weight, but the invention is not limited to any theories of the chemical constitution of the products.

It should be clearly understood that the products used in the present invention are chemically quite distinct from base exchanging bodies containing silicon, such as for example the zeolites and related base exchange bodies and their derivatives. The present compounds contain no silicon in their structure, and while they share many of the physical properties of zeolites, namely, the highly porous structure and the power of exchanging their alkali cations for other cations by base exchange, they are chemically distinct products. Surprising as it may seem, the presence of silicon, which has hitherto been considered as essential to the formation of the skeletons of such advantageous physical structure, appears to be only one of many elements which are capable of bringing about these physical properties and many of the base exchange bodies of the present invention possess all of the mechanical strength and resistance of the silicious zeolites, properties which are of course of utmost importance in catalytic oxidations of organic compounds.

A number of elements are capable of forming alkali metal metallates, at least in their higher states of oxidation, and can be used singly or in mixtures as the metallate components for producing base exchange bodies used in the present invention, it being understood of course that the choice will depend on the metal salts to be used and on the catalytic effects which it is desired to produce. Among the elements which form metallates are the following:—aluminum, chromium, zinc, vanadium, beryllium, tin, palladium, platinum, titanium, zirconium, tungsten, uranium, tantalum, boron and molybdenum. The elements which form the metallates may be present in the form of their oxides or hydroxides united with alkali to form simple metallates, or they may be present partly or wholly in the form of complex compounds, such as for example, ammonia complexes, cyanogen complexes, and the like. In general, the complex compounds described in the copending application of Jaeger and Bertsch, Serial No. 100,116, filed April 6, 1926, may be used.

The metal salt components include the water soluble, neutral or acid salts of the following elements:—copper, silver, gold, beryllium, zinc, cadmium, aluminum, rare earths, titanium, zirconium, tin, lead, thorium, chromium, uranium, vanadium, manganese, iron, nickel, cobalt, platinum, palladium, which may be used alone or in any desired mixture. It is an advantage of the present invention that definite proportions of the individual compounds do not need to be used, either because mixtures of different compounds are formed, or more probably because the tremendous size and complexity of the molecule masks any requirements for definite proportions.

All of the products used in the present invention possess base exchanging powers to a greater or less extent when first prepared in solutions which are substantially neutral or alkaline to phenolphthalein. For the oxidation of anthracene, however high base exchanging power of the products is not required and it is therefore possible to depart considerably from the optimum conditions of production as far as base exchange power goes. In other words, the limits of alkalinity, neutrality or acidity are much wider than in the case of products which are to be used for water softening, and which therefore depend primarily on their base exchanging power. While usually the highest base exchanging powers are obtained when the compounds are produced in a reaction mixture which is substantially neutral or alkaline to phenolphthalein, products having a similar physical structure and being desirable for the catalytic oxidation of organic compounds can be prepared with somewhat different proportions of the components, so that at the end of the reaction the mixture may possess any alkalinity or acidity between phenolphthalein red and litmus blue as indicator end points.

The possibilities of producing catalysts according to the present invention are not limited to the reaction products of the metallates and metal salt components which may be used and which are present in the molecules in a non-exchangeable form. On the contrary, a further series of products can be prepared by exchanging part or all of the alkali cations for other atoms or radicals by means of base exchange. The number of cations which can be introduced is very large, and some of them are included in the following elements and radicals:—ammonium, copper, silver, gold, beryllium, magnesium, caesium, zinc, strontium, cadmium, barium, mercury, aluminum, thallium, titanium, zirconium, tin, thorium, vanadium, chromium, uranium, manganese, iron, cobalt, nickel, palladium, platinum. These cations may be introduced either singly or in mixtures, simultaneously or successively. The wide possibilities of combination which can be effected by the introduction of various cations by means of base exchange gives the catalytic chemist an almost infinite field of choice in preparing catalysts having just the right degree of activity for organic oxidations and it is an advantage of the present invention that catalysts of exceedingly finely adjusted activity can be produced and are effective. The cations introduced by base exchange may be themselves catalytically active, or they may activate catalytic components which are present in the products in nonexchangeable form. Cations may also be introduced as simple ions or as complex ions. In all cases, the catalytic activity of the products obtained is enhanced by the favorable physical structure of the products.

A further series of products can be obtained by treating the base exchange bodies used in the present invention, either with or without the presence of cations introduced by base exchange, with products containing anions which are capable of reacting with the base exchange body to form salt-like products.

In the contact masses containing salt-like bodies which are used in the present invention, the catalytically effective components may be present solely in the base exchange body, solely in the anion of the salt-like body, or partly in one and partly in the other. Acid radicals of the following elements, either simple acids, polyacids or complex anions, can be used in producing salt-like bodies with the base exchange bodies of the present invention:— vanadium, tungsten, uranium, chromium, molybdenum, manganese, tantalum, arsenic, phosphorus, bismuth, sulfur, chlorine, platinum, boron. Complex ions, such as for example, ferro- and ferricyanogen, sulfocyanogen, metal cyanogen, and the like, may also be used wherever they form salt-like bodies with the base exchange bodies of the present invention. A single acid radical may be introduced, or a mixture may be used, either by a simultaneous or successive treatment. The amount of the acid radical used may also be varied so that the products may possess the character of acid, neutral or basic salts.

While it is possible to use certain of the catalysts of the present invention in an undiluted form, best results are usually obtained by the dilution of the products with more or less inert bodies, or with bodies of relatively feeble catalytic powers or activating powers. Diluents can be incorporated with the catalytically active base exchange body before or after formation, and are preferably although not necessarily, incorporated therewith to produce a physically homogeneous structure. In addition to finely divided carriers, diluted or undiluted catalytically active base exchange bodies can be coated on or impregnated in relatively massive carrier fragments, the incorporation taking place before, during or after formation of the base exchange body. It should be understood of course in all cases that where a perfectly homogeneous product is desired, the incorporation of diluents must take place before the base exchange body after formation has set. Practically all of the base exchange bodies used in the present invention are first formed as gels, in which condition they can be incorporated with diluents or carrier bodies, but after once setting, and particularly after drying, it is of course impossible to incorporate diluents into the base exchange body other than by purely physical mixture, which in general is less desirable, but which is not excluded from the broader aspects of the present invention.

A large number of diluent bodies can be used, such as silicious materials, as kieselguhrs of all kinds, diatomite brick refuse, pumice meal, pulverized quartz, sand, and other minerals, especially those rich in silica. In the same way, a large number of natural or artificial massive carrier fragments can be used, such as fragments of pumice, diatomite bricks or other minerals, metal granules and the like. In general, the methods of incorporation and many of the diluents which can be used are described in the co-pending application of Jaeger and Bertsch, Serial No. 95,771, filed March 18, 1926.

The high porosity of the products which are prepared may be even further increased by incorporating into the framework of the base exchange body products which can be removed by leaching, volatilization or combustion, and which when removed leave additional porous spaces and produce an even more advantageous physical structure. The substances added may be of organic or inorganic nature and may be added as individuals or may be in chemical combination with some of the permanent components. Thus, for example, certain of the components may be introduced in the form of complex compounds which are later decomposed and then leave additional porous spaces. Examples of such compounds are certain ammonia complexes which can be decomposed by heating the finished product.

In general, the reaction of the component solutions results, in the production of soluble salts which are not wanted, and it is therefore usually desirable to wash the base exchange body, after precipitation, and then to dry, or dry first and then wash. I have found that while it is possible in some cases to dry at high temperature, for the best results in most cases drying temperatures of 100° C., or less, are desirable.

In the general methods described above, separately prepared metallate components and metal salt components have been caused to react. While for many purposes these are the preferred methods, it is possible to prepare base exchange bodies by somewhat different methods. Thus, for example, if a solution of a metallate of amphoteric metal is cautiously neutralized with acid until the strongly alkaline reaction becomes weakly alkaline to phenolphthalein, or even slightly acid with weak alkalinity to litmus as a limit, base exchange bodies are produced, and in many cases are of importance. Instead of the metallates, the amphoteric metals may also be present in the form of complex metallate compounds, for example, such complex compounds as are described in the copending application of Jaeger and Bertsch, referred to above.

In a similar manner, acid or neutral solutions of salts of amphoteric metals may be treated with alkali until the mixture becomes neutral or alkaline to phenolphthalein, or even acid, in which case base exchange bodies are produced in a manner similar to that described in the foregoing paragraph. The base exchange bodies produced either by neutralizing metallate solutions or metal salt solutions in general do not show quite as great base exchange power as do those which are prepared by causing ready made metallate and metal salt solutions to react with each other. The physical structure, however, appears to be similar and, as in many cases, particularly in the oxidation of anthracene, extremely high base exchange power is not essential. Many very valuable catalysts can be produced in this manner.

A further wet preparation consists in causing alkali metal salts of the oxygen-containing acids of metal elements of the fifth and sixth groups of the periodic system, such as for example, vanadium, molybdenum, tantalum, tungsten, and the like, to react with neutral or acid salts of metals, particularly metals which are strongly amphoteric. Preferably there should be an excess of alkali. The salts of the fifth and sixth group acids may be used alone or in combination with other metallates.

In addition to the wet methods, which for most purposes I find are preferable, base exchange bodies can be produced by fusion methods, for example, by fusing oxides or hydroxides of the metallate and metal salt components with alkali, such as, sodium carbonate of potassium carbonate or their hydroxides. The base exchange bodies produced by fusion, while sometimes they do not possess quite as high base exchange powers, are nevertheless of a similar advantageous physical structure, and many of the products are very valuable catalysts. Oxides of the metals of the fifth and sixth groups may also be used to form products somewhat similar to those described in the preceding paragraph by fusion methods.

The non-silicious base exchange catalysts described above contain the catalytically active element or elements in chemical combination with the base exchange body or forming part thereof, and they are among the most effective catalysts used in the present invention. It is not necessary, however, that the catalytic activity should reside in the base exchange body itself, and many very important catalysts can be produced in which catalytically inactive base exchange bodies are united with catalytically active diluents to form physically homogeneous masses. These masses, although they do not contain catalytic elements chemically combined with the base exchange body, of course share its microporous structure, and where suitable catalytically active diluents are used, catalysts of great efficiency are obtained, and are included in the scope of the present invention. Of course the catalytic activity may reside both in the diluents and in the base exchange body.

The catalysts used in the present invention, and particularly diluted catalysts, may in many cases with advantage be given a preliminary treatment consisting in a calcination and exposure to oxidizing or acid vapors at an elevated temperature as described in my Patents 1,678,626 and 1,678,627, dated July 24, 1928. Such treatments frequently produce secondary chemical changes as are produced in the catalysis themselves, and it should be understood that the catalysts of the present invention are defined as to chemical composition as of the time when they are freshly made, in accordance with the usual methods of definition in catalytic chemistry.

Many of the organic reactions which are included in the present invention, and particularly the oxidation of anthracene, require a slowing down, or stabilizing, of the catalysts used, in order to prevent excessive losses through total combustion, or to permit stopping at a definite intermediate oxidation product with maximum yield. I have found that the presence of salts of alkali-forming metals and other non-catalytic components may act as stabilizers, as may the oxides or hydroxides themselves in some reactions. Other catalytically active or activating substances which are not specific catalysts for the oxidation of anthracene to anthraquinone which enhance the effectiveness of the stabilizers, and which are termed stabilizer promoters, may also be used. In fact whenever base exchange catalysts of the present invention which contain exchangeable alkali metal cations are given preliminary treatment with acid vapors, alkali forming metal compounds are produced which act as stabilizers, and many of the amphoteric or other metal components which are not selective catalysts for the particular oxidation reaction may be considered, and act as stabilizer promoters. I do not claim in this application the use of stabilizers or stabilizer promoters in general, as these form the subject-matter of my co-pending application, Serial No. 264,571, filed Mar. 24, 1928. The expressions "stabilizers" and "stabilizer promoters" when used in the present application, are to be understood as used in the sense in which they are defined in the afore-mentioned co-pending application. It should be understood that while many of the base exchange catalysts used in the present invention may be considered as composite stabilizers and stabilizer promoters, the invention is not limited thereto, and stabilizers or stabilizer promoters, or both, may be separately added to the catalysts of the present invention, and in fact many of the diluents, for example those containing certain heavy or amphoteric metal compounds, are to be considered as stabilizer promoters.

The present invention is not only applicable to the oxidation of relatively pure or high grade anthracene, but may also be used for the oxidation of impure anthracene, for example, anthracene containing carbazole or phenanthrene as impurities. When impure anthracene is oxidized the contact mass preferably should contain stabilizers or stabilizer promoters which favor the total combustion of the impurities. Thus for example strongly alkaline stabilizers, which are relatively poor stabilizers for the oxidation of pure anthracene to anthraquinone, are effective in the selective total combustion of carbazole and similar nitrogenous heterocyclic compounds. When impure anthracene is oxidized the reaction may take place in a single step, or it may take place in two steps, part of the contact mass favoring the selective combustion of impurities and part favoring the oxidation of anthracene to anthraquinone. It is one of the great advantages of the present invention that the range of quality of anthracene which can be used is very great, and relatively low grade anthracene can be effectively handled. It should be understood that when the reaction takes place in a single stage a compromise contact mass must be used as the most effective contact masses for the oxidation of anthracene to anthraquinone are not always the most effective for the selective combustion of impurities. The best compromise will depend on the nature of the crude anthracene used and on the nature of the contact mass chosen.

The invention will be described in greater detail in connection with the following specific examples which are illustrative merely, and do not limit the broader scope of the invention. The examples, however, do in many cases contain specific features which in their more narrow aspects are included in the present invention. The examples give a few typical reaction conditions and catalysts, but it should be understood that the skilled catalytic chemist will choose within the confines of the present invention catalysts and reaction conditions best suited to the particular installation in which he is interested.

*Example 1*

A vanadyl base exchange body is prepared by suspending 20 parts of $V_2O_5$ in 500 parts of water, adding a little concentrated sulfuric acid and then reducing the $V_2O_5$ with gases containing sulfur dioxide at the boiling point until it is completely transformed into blue vanadyl sulfate. The vanadyl sulfate solution is then divided into two parts, half of which is treated at 50–60° C. with sufficient 5NKOH to form a clear coffee-brown solution of potassium vanadite, to which 50 parts of "Celite" earth is added as a diluent. The second half of the original solution is then added with vigorous agitation, care being taken that the alkalinity remains between phenolpthalein red and litmus blue. The gelatinous product is sucked but not dried and constitutes a vanadyl base exchange body.

10.2 parts of freshly precipitated aluminum oxide are brought into solution with 40 parts of 100% KOH in 200 parts of water. The vanadyl base exchange body described above is then stirred into the solution and a 10% aqueous solution containing 37 parts of ferric sulfate with 9 mols of water or 44.4 parts of aluminum sulfate with 18 mols of water or a mixture of the two is added to the aluminate mixture with vigorous agitation. The reaction product produced, which is an aluminum iron base exchange body and which does not possess effective catalytic properties for the catalytic oxidation of most organic compounds, is diluted with the catalytically active vanadyl base exchange body and is thereby transformed into a highly active catalyst for the above referred to processes. The reaction product is sucked, pressed, washed with 300–400 parts of water, dried and broken into fragments. The fragments may be treated with 5% copper sulfate, silver nitrate, cobalt nitrate or iron nitrate solutions to partly replace the alkali with these metals. The product may also be treated with salts of the metal oxygen acids of the fifth and sixth groups, preferable with a 1% ammonium vanadate solution, resulting in a so-called salt-like body after the soluble components have been washed out.

The products are calcined with air or gases containing carbon dioxide at 400° C. the calcination temperature being permitted to rise gradually in order to prevent undesirable changes in the structure of the base exchange body. After this preliminary calcination the product may be preferably treated with 3–5% burner gases at 450° C. and is then ready for use.

The contact mass so obtained is well suited for the catalytic oxidation of anthracene to anthraquinone. The vapors of the anthracene mixed with air or other oxygen containing gases, such as, for example, $CO_2$ and oxygen, in the proportion of from 1:20 to 1:30 are passed over the catalyst at 350–420° C.

In this example the aluminum iron base exchange body may be considered as a complex stabilizer for the catalyst. In order to promote or tune the stabilizing action of the catalyst various stabilizer promoters can be added in the form of silicates or heavy metal oxides such as ferric oxide, copper oxide, titanium dioxide, manganese dioxide, zirconium dioxide, cerium dioxide, beryllium oxide, calcium oxide, cobalt oxide or thorium dioxide. They may be added singly or in mixtures and may advantageously be formed in a nascent state. The amount of the stabilizer promoter added depends on the effect desired; in general from 2–5% of such stabilizer promoters gives good results. These stabilizer promoters, of course, may be added in the same manner as any other diluent as has been generally described in the introductory portion of this application.

A different method of introducing the stabilizer promoters consists in replacing part or all of the metal salt components of the base exchange body with corresponding amounts of beryllium sulfate, silver nitrate, nickel sulfate, cadmium sulfate or similar mineral acid salts of these bases.

In many cases it is desirable to neutralize excess alkali in the reaction products with 5% mineral acid such as hydrochloric acid, sulfuric acid, nitric acid or the like until the alkalinity has been brought to the desired point. Other catalytically active base exchange bodies, may, of course, be introduced as diluents instead of the one described.

Example 2

A potassium vanadate solution is prepared by transforming 15 parts of $V_2O_5$ into the potassium metavanadate with N/2KOH and then diluting with 400 parts of water. 10 parts $M_nO_2$ and 50 parts of kieselguhr or pumice meal are then stirred in. To these mixtures are added either 10 parts of freshly precipitated aluminum oxide or 5 parts of aluminum oxide and 8 parts of freshly precipitated ferric oxide, with sufficient NKOH solution to cause the entire mixture to react neutral or weakly alkaline to phenolphthalein. The reaction mixture is then sucked and worked up in the usual manner and an efficient contact mass for the catalytic oxidation of anthracene to anthraquinone is obtained.

Example 3

12 parts of $V_2O_5$ are suspended in 250 parts of water to form a slurry, acidified with 5 parts of concentrated sulfuric acid and then reduced to the blue vanadyl sulfate in the usual manner, for example, by means of gases containing $SO_2$ which are passed into the solution at the boiling point. 107 parts of waterglass solution at 33° Bé. are then diluted with 200 parts of water and about 60 parts of "Celite" stirred in. The waterglass solution is then poured into the vanadyl sulfate solution with vigorous agitation, precipitating out vanadyl silicate. Care should be taken that after all of the solutions have reacted the resulting mixture must be made neutral to litmus, if necessary with the help of small amounts of N. sulfuric acid. 10 parts of freshly precipitated aluminum oxide are treated with sufficient N/2KOH solution to dissolve up the aluminum oxide in the form of potassium aluminate and to provide a 10% excess of KOH.

37 parts of $Fe_2(SO_4)_3$ 9 aq. are dissolved in 250 to 300 parts of water.

Instead of using this latter salt component for the formation of the base exchange body, corresponding amounts of titanium sulfate, aluminum sulfate, copper nitrate, cobalt nitrate, nickel sulfate, thorium nitrate, silver nitrate, zirconium nitrate, cerium nitrate, or a mixture of them can be used.

The vanadyl silicate is then stirred into the aluminate solution diluted with "Celite" and thereupon the above mentioned salt component or components are added producing a base exchange body in which the vanadyl silicate is homogeneously incorporated as a diluent.

The reaction product is treated in the usual way by pressing and drying below 100° C. and is broken into fragments. After hydration by trickling water over the fragments the alkali of the base exchangeable part can be replaced by iron, using a 5% iron sulfate solution. Replacing the alkali of the base exchange by copper, silver, nickel and lead, using a 5% to 10% solution of the corresponding salts or their mixtures, favorably influences the catalytic efficiency of such contact masses for the catalytic oxidation of organic compounds.

Treatment with ammonium vanadate or molybdate for the formation of the so-called salt-like body helps to enhance the catalytic efficiency for specific oxidation reactions and also the resistance of such contact masses against high temperatures often obtaining in these processes.

Contact masses containing such components are well suited for the catalytic oxidation of anthracene to anthraquinone.

These organic compounds are mixed with air in the ratio of 1:35 by weight and are passed over the contact mass at 340° to 440° C.

Example 4

20 parts of 33° Bé. sodium waterglass solution are diluted with 15 to 20 volumes of water and 60 to 80 parts of infusorial earth are added. Sufficient 5% iron sulfate, copper sulfate, silver nitrate, calcium chloride, strontium chloride, and manganese nitrate solution, singly or in admixture, are added with vigorous agitation to bring about a neutral reaction to litmus. The precipitate is sucked and thoroughly washed with water to get the alkali metal salt out of it and then constitutes diluted neutral silicates of the metals used which can be further worked up without drying.

10 parts of $Al_2O_3$, freshly precipitated, are transformed into potassium aluminate using a sufficient amount of 2N.KOH solution to provide an excess alkali amounting to about 10% to 15%. The diluted silicates described above are kneaded into this solution. 50 parts of $Al_2(SO_4)_3 18H_2O$ are dissolved in about 200 parts of water. The latter solution is then kneaded with the aluminate mixture and after addition of all the solution, an alkaline or neutral reaction to phenolphthalein should be obtained.

The diluted reaction product so obtained is freed from mother liquor by pressing, dried at temperatures under 100° C. and broken in pieces. The dried fragments are leached out by trickling water over them and then are treated with a 5% vanadyl sulfate solution, chromium nitrate solution or uranyl nitrate solution or a mixture of them, in order to exchange, as far as possible, the alkali for these radicals. Thereafter the product is impregnated with a dilute potassium or ammonium vanadate solution in order to form the so-called salt-like body, that is, the vanadate of the vanadyl base exchange body diluted with silicates and infusorial earth.

After drying and calcining, the contact mass so obtained is very efficient for the catalytic oxidation of anthracene to anthraquinone when the vapors of the anthracene, mixed with air in the ratio of 1:20 by weight, are passed over the catalyst at 340° to 420° C.

The silicates act in this contact mass as stabilizer promotors in the reaction and at the same time render the contact mass highly resistant to high temperatures often obtaining in such catalytic oxidation processes.

Instead of neutral silicates, 5% to 10% of $TiO_2$, $Fe_2O_3$ or MnO, singly or in admixture, can be used, the amount depending on the diluent.

*Example 5*

Diluted base exchange bodies, as described in the foregoing examples, are prepared with diluents which have been impregnated with ferric oxide, silver oxide or copper oxide, the diluents being incorporated into the base exchange body during its formation. These products are then sprayed with sufficient normal sulfuric acid to form the so-called salt-like bodies and to completely neutralize the alkali content of the base exchange body. Such a contact mass containing 6–8% of ferric oxide is particularly effective for the oxidation of anthracene to anthraquinone at a temperature of 350–400° C. when a mixture of anthracene and air in a proportion of 1:40 is passed over the catalyst.

Similar catalysts can be obtained by impregnating the diluents with ferric sulfate, silver nitrate or copper nitrate.

In most of the examples the metal salt solution is added to the metallate solution, and this may be considered as the preferred method for producing non-silicious base exchange bodies used as contact masses in the present invention, but it should be understood that the invention is not limited to the use of contact masses or catalysts produced by this preferred procedure. On the contrary, some valuable contact masses may be produced by the converse procedure, in which the metallate solution is added to the metal salt solution. As in this case the relatively alkaline solution is added to the relatively acid solution it is impossible to maintain continuously an alkaline reaction. Care must of course be taken in all cases after the reaction is completed that the mixture shows alkalinity to litmus, and preferably a neutrality of alkalinity to phenolphthalein.

What is claimed as new is:

1. A method of oxidizing anthracene to anthraquinone, which comprises vaporizing anthracene and causing the vapors to react with an oxidizing gas in the presence of a contact mass containing at least one non-silicious base exchange body.

2. A method of oxidizing anthracene to anthraquinone, which comprises vaporizing anthracene and causing the vapors to react with an oxidizing gas in the presence of a contact mass containing at least one diluted non-silicious base exchange body.

3. A method of oxidizing anthracene to anthraquinone, which comprises vaporizing anthracene and causing the vapors to react with an oxidizing gas in the presence of a contact mass containing at least one non-silicious base exchange body, at least one catalytically active component of the contact mass being chemically combined in or with the non-silicious base exchange body.

4. A method of oxidizing anthracene to anthraquinone, which comprises vaporizing anthracene and causing the vapors to react with an oxidizing gas in the presence of a contact mass containing at least one non-silicious base exchange body, at lease one catalytically active component of the contact mass being chemically combined in or with the non-silicious base exchange body in non-exchangeable form.

5. A method of oxidizing anthracene to anthraquinone, which comprises vaporizing anthracene and causing the vapors to react with an oxidizing gas in the presence of a contact mass containing at least one diluted non-silicious base exchange body, at least one catalytically effective component of the contact mass being physically associated with the non-solicious base exchange body in the form of a diluent.

6. A method of oxidizing anthracene to anthraquinone, which comprises vaporizing anthracene and causing the vapors to react with an oxidizing gas in the presence of a contact mass containing at least one non-silicious base exchange body, the contact mass also containing at least one compound of an element falling within the group including alkali metals, alkaline earth metals, and earth metals whose oxides are not reducible by hydrogen.

7. A method of oxidizing anthracene to anthraquinone, which comprises vaporizing anthracene and causing the vapors to react with an oxidizing gas in the presence of a contact mass containing at least one non-silicious base exchange body, the contact mass also containing at least one compound of an element falling within the group including alkali metals, alkaline earth metals, and earth metals whose oxides are not reducible by hydrogen and at least one solid catalyst, non-specific to anthracene oxidation.

8. A method of oxidizing anthracene to anthraquinone, which comprises vaporizing anthracene and causing the vapors to react with an oxidizing gas in the presence of a contact mass containing at least one non-silicious base exchange body, at least one compound of an element falling within the group including alkali metals, alkaline earth metals, and earth metals whose oxides are not reducible by hydrogen chemically combined in the non-silicious base exchange body.

9. A method of oxidizing anthracene to anthraquinone, which comprises vaporizing anthracene and causing the vapors to react with an oxidizing gas in the presence of a contact mass containing at least one non-silicious base exchange body, at least one compound of an element falling within the group including alkali metals, alkaline earth metals, and earth metals whose oxides are not reducible by hydrogen and at least one solid catalyst, non-specific to anthracene oxidation chemically combined in or with the non-silicious base exchange body.

10. A method of oxidizing anthracene to anthraquinone, which comprises vaporizing anthracene and causing the vapors to react with an oxidizing gas in the presence of a contact mass containing at least one non-silicious base exchange body, at least one compound of an element falling within the group including alkali metals, alkaline earth metals, and earth metals whose oxides are not reducible by hydrogen and at least one solid catalyst, nonspecific to anthracene oxidation chemically combined in or with the non-silicious base exchange body in non-exchangeable form.

11. A method of oxidizing anthracene to anthraquinone, which comprises vaporizing anthracene and causing the vapors to react with an oxidizing gas in the presence of a contact mass containing at least one non-silicious base exchange body, the contact mass containing an oxy-compound of vanadium as at least one of its catalytically active components.

12. A method of oxidizing anthracene to anthraquinone, which comprises vaporizing anthracene and causing the vapors to react with an oxidizing gas in the presence of a contact mass containing at least one non-silicious base exchange body in which chemically combined vanadium is present.

13. A method of oxidizing anthracene to anthraquinone, which comprises vaporizing anthracene and causing the vapors to react with an oxidizing gas in the presence of a contact mass containing at least one non-silicious base exchange body, the contact mass containing iron as a non-specific catalyst.

14. A method of oxidizing anthracene to anthraquinone, which comprises vaporizing anthracene and causing the vapors to react with an oxidizing gas in the presence of a contact mass containing at least one diluted non-silicious base exchange body, at least part of the diluents containing vanadium compounds.

15. A method of oxidizing anthracene to anthraquinone, which comprises vaporizing anthracene and causing the vapors to react with an oxidizing gas in the presence of a contact mass containing at least one diluted non-silicious base exchange body, at least part of the diluents containing iron vanadate.

16. A method according to claim 6, in which the stabilizer is a non-alkaline compound of potassium.

17. A method according to claim 6, in which the stabilizer is formed in situ by treating the contact mass with acid gases.

18. A method of oxidizing anthracene to anthraquinone, which comprises vaporizing anthracene and causing the vapors to react with an oxidizing gas in the presence of a contact mass containing at least one diluted non-silicious base exchange body, at least part of the diluents containing oxy-compounds of iron.

Signed at Pittsburgh, Pennsylvania, this 21st day of March, 1928.

ALPHONS O. JAEGER.